United States Patent
Kishan et al.

(10) Patent No.: US 7,041,774 B2
(45) Date of Patent: May 9, 2006

(54) FUNCTIONALIZED ZEOLITE COMPOSITIONS AND METHODS FOR THEIR PREPARATION AND USE

(75) Inventors: Gurram Kishan, Bangalore (IN); Rajappan Vetrivel, Bangalore (IN); Nileshkumar Prakash Kukalyekar, Sangli (IN); Adil Minoo Dhalla, Dadar Mumbai (IN); Jonathan L. Male, Schoharie, NY (US); James L. Spivack, Cobleskill, NY (US); Arumugamangalam Venkataraman Ramaswamy, Pune (IN); Anand Pal Singh, Pune (IN)

(73) Assignee: General Electric Company, Schenectady, NY (US)

( * ) Notice: Subject to any disclaimer, the term of this patent is extended or adjusted under 35 U.S.C. 154(b) by 237 days.

(21) Appl. No.: 10/675,141

(22) Filed: Sep. 30, 2003

(65) Prior Publication Data

US 2005/0070423 A1    Mar. 31, 2005

(51) Int. Cl.
    *B01J 29/06*    (2006.01)

(52) U.S. Cl. .................. 528/196; 528/198; 502/60; 502/62; 502/64; 502/71; 502/77; 502/78; 502/79

(58) Field of Classification Search .............. 502/60, 502/62, 64, 71, 77, 78, 79; 528/196, 198
See application file for complete search history.

(56) References Cited

U.S. PATENT DOCUMENTS

| | | | | |
|---|---|---|---|---|
| 3,888,826 A | * | 6/1975 | Yamana et al. ............ | 528/196 |
| 4,217,438 A | | 8/1980 | Brunelle et al. | |
| 5,463,140 A | | 10/1995 | Wehmeyer et al. | |
| 6,229,037 B1 | * | 5/2001 | Okubo et al. ............ | 556/428 |
| 6,331,500 B1 | * | 12/2001 | Tsuji et al. ............... | 502/63 |

FOREIGN PATENT DOCUMENTS

| | | |
|---|---|---|
| EP | 0 319 327 A1 | 12/1988 |
| EP | 0693470 A1 | 1/1996 |
| EP | 0765897 | 4/1997 |
| JP | 1997-110989 A | 4/1997 |

OTHER PUBLICATIONS

G.D. Yadav et al., "Synthesis of bisphenol-A: comparison of efficacy of ion exchange resin catalysts vis-a-vis heteropoly-acid supported on clay and kinetic modelling", Applied Catalysis A: General 154 (1997) 29-53.

K. Nowinska et al., "Synthesis of Bisphenol-A over heteropoly compounds encapsulated into mesoporous molecular sieves", Applied Catalysis A: General 203 (2000) 91-100.

D. Das et al., "Sulfonic acid functionalized mesoporous MCM-41 silica as a convenient catalyst for Bisphenol-A synthesis", Chem. Commun., 2001, 2178-2179.

Yang et al., "Sulfuric Acid-Functionalized Mesoporous Benzene-Silica with a Molecular-Scale Periodicity in the Walls", J. Am. Chem. Soc. 2002, 124, 9694-9695.

Internationl Search Report for International Application No. PCT/US2004/024560 filed on Jul. 29, 2004.

A.P. Singh, Preparation of Bisphenol-A Over Zeolite Catalysts, Catalysis Letters 16 (1992) 431-435.

W.M. Van Rhijn et al., Sulfonic Acid Functionalised Ordered Mesoporous Materials as Catalysts for Condensation ANS Esterification Reactions; Chem. Commun., 1998, pp. 317-318.

K. Wilson et al., Structure and Reactivity of Sol-Gel Sulphonic Acid Silicas, Applied Catalysis A: General 228 (2002) 127-133.

* cited by examiner

*Primary Examiner*—Christina Johnson

(57) ABSTRACT

Disclosed herein are zeolite compositions comprising structural units of the formulae:

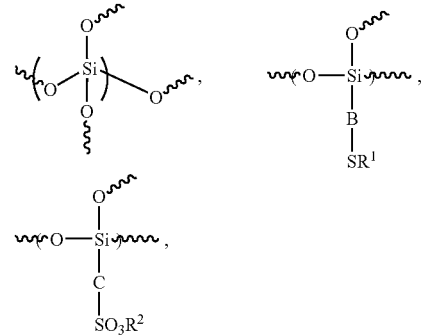

wherein "B" and "C" are spacer groups comprising $C_2$ to $C_{20}$ hydrocarbyl groups; and $R^1$ and $R^2$ independently of each other comprise alkali metal, hydrogen, or $C_1$ to $C_{20}$ alkyl groups. The zeolite compositions further comprise structural units derived from a heteropolyacid compound of the formula: $(M^3)_3(M^4)(M^5)_{12}O_{40}$; where $M^3$ comprises hydrogen or an alkali metal; $M^4$ comprises phosphorus or silicon, and $M^5$ comprises tungsten or molybdenum. Methods for preparing these zeolite compositions are also disclosed. The zeolite compositions are useful as catalysts for producing bisphenols.

46 Claims, No Drawings

FUNCTIONALIZED ZEOLITE COMPOSITIONS AND METHODS FOR THEIR PREPARATION AND USE

BACKGROUND

This disclosure generally relates to functionalized zeolite compositions and their use as catalysts for the production of bisphenols. The disclosure further relates to methods for preparing these functionalized zeolite compositions.

Bisphenols are valuable raw materials for producing polycarbonates. Polycarbonates are widely used in a variety of applications by virtue of their excellent physical properties, such as impact resistance, mechanical characteristics, transparency, and the like. Bisphenols are generally obtained by the reaction of a carbonyl compound, e.g., acetone, with a phenol in the presence of an acidic catalyst, such as mineral acids or acidic ion exchange resins. Due to environmental concerns from use of corrosive mineral acids, solid acid catalysts such as ion exchange resins have been increasingly used for preparing bisphenols. Furthermore, solid acid catalysts lead to a more efficient and simple separation of product stream and catalyst. Other types of solid acid catalysts, such as for example, synthetic alumino silicates, e.g., H-ZSM-5, H-Mordenite, and H-Y zeolite, as well as heteropolyacids have also been used for preparing bisphenols. However, all of these types of catalysts exhibit relatively low selectivities and/or reactivity.

One example of acidic ion exchange resins are the series of sulfonated polystyrene resins cross-linked with divinyl-benzene, (PS-DVB). Frequently, a co-catalyst is used in conjunction with the acidic ion exchange resin catalyst, to improve the selectivity for bisphenol, and in particular, the para, para-bisphenol isomer. Co-catalysts can be present as unattached molecules in the bulk reaction matrix, e.g., "bulk co-catalysts", or can be attached to the acidic ion exchange resin catalyst through ionic or covalent linkages. Mercaptans are a useful class of co-catalysts. More specifically, thiols, e.g., organosulfur compounds which are derivatives of hydrogen sulfide, can be used as co-catalysts. Numerous efforts have been made to improve the selectivity for bisphenols by varying the ratio of the mercaptan co-catalyst to the acidic catalyst. One approach that has recently been attempted is to use a acidic ion exchange resin catalyst having an attached co-catalyst, which are prepared, for example, by reacting a portion of the acidic groups of the acidic ion exchange resins with aminomercaptans, thereby resulting in catalysts containing both mercaptan and sulfonic acid groups.

When ion exchange resin catalysts are used for making bisphenols by reaction of phenols with carbonyl compounds, the lifetime of the catalyst is affected by factors, such as its mechanical strength and its tendency to foul. Furthermore, use of these catalysts requires pre-conditioning of the catalyst with phenol, especially in continuous processes. Pre-conditioning is generally done by passing the phenol through a packed bed of the ion exchange resin catalyst.

Thus, there remains a need for alternative catalysts that can be used for producing bisphenols with high selectivity while minimizing the formation of deleterious by-products. It would also be beneficial to have a catalyst with a solid acid matrix that is rigid and does not swell in the reaction medium to an undefined/non specific pore structure. Furthermore, there is a need for such catalysts which not only have built-in functionalities for performing as a catalyst and a co-catalyst, but which also afford improved bisphenol selectivity, particularly for the para, para-isomer. Moreover, there is also a need for such alternative catalysts that have potentially superior mechanical properties as compared to the traditionally used ion-exchange resins, thereby leading to improved catalyst lifetime and bisphenol productivity.

BRIEF SUMMARY

Disclosed herein is a functionalized zeolite composition comprising structural units of the formulae:

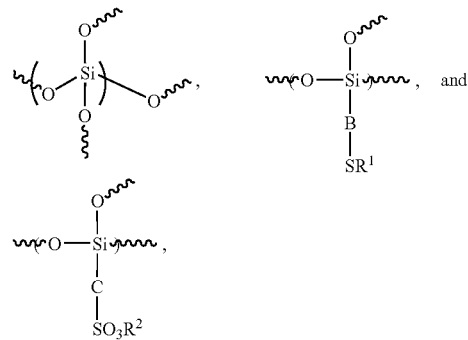

wherein "B" and "C" are spacer groups comprising $C_2$ to $C_{20}$ hydrocarbyl groups, and $R^1$ and $R^2$ independently comprise an alkali metal, a hydrogen, or a $C_1$ to $C_{20}$ alkyl group.

A method of making the functionalized zeolite composition comprises reacting: at least one reactant selected from the group consisting of a fumed silica and an alkyl metalate comprising a tetraalkylorthosilicate, a mercapto-functionalized alkoxysilane, a silyl sulfonic acid compound, and a template compound; and producing the zeolite composition comprising the structural units of the formulae

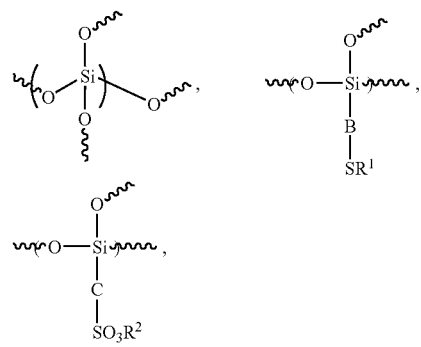

wherein "B" and "C" are spacer groups comprising $C_2$ to $C_{20}$ hydrocarbyl groups; and $R^1$ and $R^2$ independently comprise an alkali metal, a hydrogen, or a $C_1$ to $C_{20}$ alkyl group.

In accordance with another embodiment, a method of making a functionalized zeolite composition comprises reacting a template compound, at least one first reactant selected from the group consisting of filmed silica and an alkyl metalate comprising a tetraalkylorthosilicate, and a first mercapto-functionalized alkoxysilane to form a first intermediate product; oxidizing said first intermediate product with an oxidizing agent to form a second intermediate product; and reacting second intermediate product with a second mercapto-functionalized alkoxysilane to produce a functionalized zeolite composition comprising structural units of the formulae

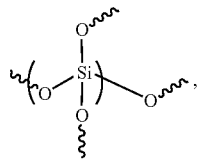 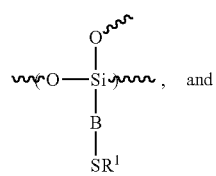 and

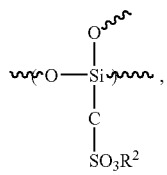

wherein "B" and "C" are spacer groups comprising $C_2$–$C_{20}$ hydrocarbyl groups; and $R^1$ and $R^2$ independently of each other comprise alkali metal, hydrogen, or alkyl groups.

A method of making a heteropolyacid-functionalized zeolite composition comprises reacting in a solvent a template compound, at least one first reactant selected from the group consisting of fumed silica and an alkyl metalate comprising a tetraalkylorthosilicate, and a first mercapto-functionalized alkoxysilane to form a first intermediate product; oxidizing said first intermediate product with an oxidizing agent to form a second intermediate product; and reacting the second intermediate product with a second mercapto-functionalized alkoxysilane to form a third intermediate product; and reacting said third intermediate product with a heteropolyacid compound to produce the heteropolyacid-functionalized zeolite composition comprising structural units of the formulae

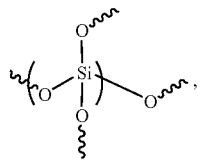 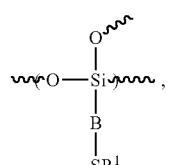

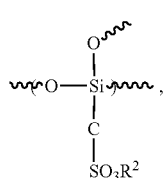

wherein "B" and "C" are spacer groups comprising $C_2$–$C_{20}$ hydrocarbyl groups; and $R^1$ and $R^2$ independently of each other comprise alkyl metal, hydrogen, or alkyl groups.

A method of producing an aromatic bisphenol comprises reacting a carbonyl compound with an aromatic hydroxy compound in the presence of a functionalized zeolite composition as catalyst; wherein said functionalized zeolite composition comprises structural units of the formulae:

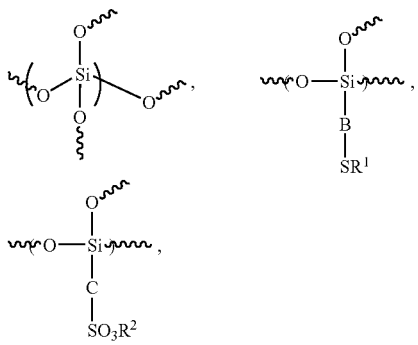

wherein "B" and "C" are spacer groups comprising $C_2$ to $C_{20}$ hydrocarbyl groups; and $R^1$ and $R^2$ independently comprise an alkali metal, a hydrogen, or an alkyl group.

The above described and other features are exemplified by the following detailed description.

DETAILED DESCRIPTION

Disclosed herein are functionalized zeolite catalyst compositions suitable for catalyzing the condensation reaction of phenols with carbonyl compounds. In one embodiment, the functionalized zeolite catalyst compositions comprise structural units of formulae (I), (II), and (III) as shown:

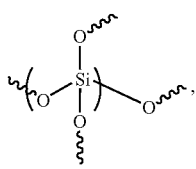 (I)

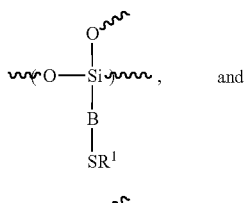 and (II)

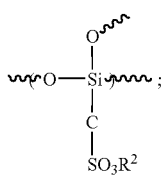 (III)

wherein "B" and "C" are spacer groups comprising $C_2$ to $C_{20}$ hydrocarbyl groups; and $R^1$ and $R^2$ independently of each other comprise an alkali metal, hydrogen, or a $C_1$ to $C_{20}$ alkyl group.

The term "hydrocarbyl" as used herein is intended to designate aromatic groups and aliphatic groups, such as alkyl groups. The term "alkyl" as used herein is intended to designate straight chain alkyls, branched alkyls, aralkyls, cycloalkyls, and bicycloalkyl groups. Suitable illustrative non-limiting examples of aromatic groups include, for example, substituted and unsubstituted phenyl groups. The straight chain and branched alkyl groups include as illustrative non-limiting examples, methyl (as in the case of $R^1$ and $R^2$ above), ethyl, n-propyl, isopropyl, n-butyl, sec-butyl, tertiary-butyl, pentyl, neopentyl, hexyl, heptyl, octyl, nonyl, decyl, undecyl and dodecyl. In various embodiments, cycloalkyl groups represented are those containing about 3 to about 12 ring carbon atoms. Some illustrative non-limiting examples of these cycloalkyl groups include cyclobutyl, cyclopentyl, cyclohexyl, methylcyclohexyl, and cycloheptyl. In various other embodiments, aralkyl groups are those containing about 7 to 14 carbon atoms; these include, but are not intended to be limited to, benzyl, phenylbutyl, phenylpropyl, and phenylethyl. In various other embodiments, aromatic groups are intended to designate monocyclic or polycyclic moieties containing about 6 to about 12 ring carbon atoms. These aryl groups may also contain one or more halogen atoms or alkyl groups substituted on the ring carbons. Preferably, the substituent, if present, is not in a ring position that would prevent the aromatic group from reacting with an olefinic group, such as in a monoterpene. Some illustrative non-limiting examples of these aromatic groups include phenyl, halophenyl, biphenyl, and naphthyl.

The structural units of formula (I) are preferably derived from fumed silica or an alkyl metalate comprising a silica precursor, such as a tetraalkyl orthosilicate, or mixtures thereof. The tetraalkyl orthosilicate is of the formula (IV):

$$(R^3O)_4Si \quad (IV);$$

wherein $R^3$ comprises an alkyl group, preferably an alkyl group having from 1 to about 6 carbon atoms. Examples of tetraalkyl orthosilicates that can be used include, but are not intended to be limited to, tetramethyl orthosilicate, tetraethyl orthosilicate, tetra(n-propyl) orthosilicate, tetraisopropyl orthosilicate, tetratetrabutyl orthosilicate, tetrakis(dimethylsilyl)orthosilicate, and tetraphenyl orthosilicate. In another embodiment, the tetraalkyl orthosilicate can also have other functional groups, such as hydroxy groups, as exemplified by tetrakis(2-hydroxyethyl)orthosilicate, tetrakis(2-hydroxypropyl)orthosilicate, and the like. Any mixture of two or more tetraalkyl orthosilicates can also be used for obtaining the structural units of formula (I). Besides the symmetrically substituted tetraalkyl orthosilicates described above, unsymmetrical tetraalkyl orthosilicates, which have one or more dissimilar alkyl groups around the silicon atom can also be used as silica precursors.

The structural units of formula (II) are preferably derived from mercapto-functionalized alkoxysilanes of the formula (V):

$$R^1S-B-Si(OR^5)_n(R^6)_{3-n} \quad (V);$$

wherein "n" is an integer having values from 1 to about 3; $R^1$ comprises alkali metal, hydrogen, or alkyl groups; "B" is a spacer group comprising $C_2-C_{20}$ hydrocarbyl groups, preferably a $C_2-C_8$ alkyl group; $R^5$ comprises hydrogen or alkyl groups; and $R^6$ comprises alkyl groups or alkoxy groups. Non-limiting examples of the spacer group "B" include $-(C_6H_4)CH_2-$, 1,2-ethylene, 1,3-propylene, 1,4-butylene, 1,5-pentylene, 1,6-hexylene, and 1,4-phenylene. Non-limiting examples of the mercapto-functionalized alkoxysilanes include (3-mercaptopropyl)trimethoxysilane, (3-mercaptopropyl)triethoxysilane, (3-tert-butylmercaptopropyl)trimethoxysilane, (3-tert-butylmercaptopropyl)triethoxysilane, or mixtures of the foregoing alkoxysilanes. (3-mercaptopropyl)trimethoxysilane is particularly advantageous since it is commercially readily available.

Structural units of formula (III) are preferably derived from organosilyl sulfonic acid compounds of formula (VI):

$$(SO_3R^2)-C-Si(OR^7)_n(R^8)_{3-n} \quad (VI);$$

wherein "C" is a spacer group selected from the group consisting of $C_2-C_{20}$ hydrocarbyl groups; $R^2$ comprises hydrogen, alkali metal, or alkyl groups, $R^7$ comprises hydrogen or alkyl groups; and $R^8$ comprises OH, $C_1-C_8$ alkyl groups, or alkoxy groups; and The spacer group "C" is preferably a $C_2-C_8$ alkyl group. Non-limiting examples of the spacer group "C" include $-(C_6H_4)CH_2-$, 1,2-ethylene, 1,3-propylene, 1,4-butylene, 1,5-pentylene, 1,6-hexylene, and 1,4-phenylene. In one embodiment, the organosilyl sulfonic acid compound is one or more compounds selected from the group consisting of (3-trihydroxysilyl)propanesulfonic acid, (3-trimethoxysilyl)propanesulfonic acid, (3-triethoxysilyl)propanesulfonic acid, (4-trimethoxysilyl)phenylmethanesulfonic acid, and the corresponding ester derivatives of the foregoing sulfonic acids. Preparation of the organosilyl sulfonic acids is well known in the art. For example, (3-trimethoxysilyl)propanesulfonic acid can be prepared by oxidizing (3-mercaptopropanesulfonic acid with a suitable oxidizing agent, such as potassium permanganate in an appropriate solvent, such as acetone. (4-trimethoxysilyl)phenylmethanesulfonic acid can be prepared by treating (4-trimethoxysilyl)benzyl chloride with sodium sulfite in a solvent, such as ethanol, and stirring the reaction mixture overnight at a temperature of about 75° C. The resulting sodium (4-trimethoxysilyl)phenylmethanesulfonate is treated with a strong acid, such as an acidic ion exchange resin to provide the desired (4-trimethoxysilyl)phenylmethanesulfonic acid.

The zeolite composition may further include a structural unit of formulae (VII) and/or (VIII):

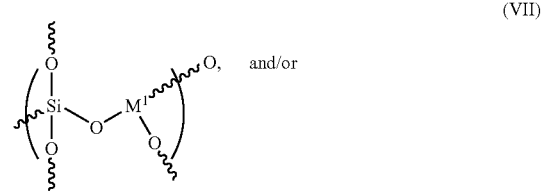

(VII)

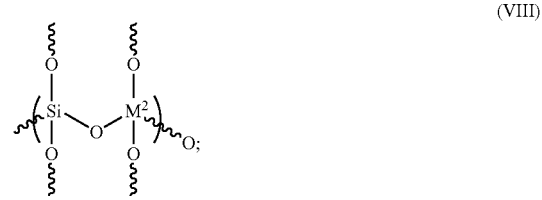

(VIII)

wherein $M^1$ comprises a Group III element, and $M^2$ comprises titanium or zirconium.

Such structural units, i.e., formulae (VII) and (VIII), are derived by including with the fumed silica or tetraalkyl orthosilicates reactant, alkyl metalates selected from the group represented by the formulae (IX) and (X):

$$(R^4O)_3M^1 \quad (IX)$$

and

$$(R^4O)_3M^2 \quad (X);$$

wherein $R^4$ is independently at each occurrence an alkyl group or any aryl group having from 1 to about 20 carbon atoms; "M¹" comprises the Group III element, and "M²" comprises titanium or zirconium. In a preferred embodiment, "M¹" comprises a Group IIIA such as, for example, aluminum, boron or gallium. "M²" preferably comprises a Group IVB element, such as, for example, titanium or zirconium. When it is desirable to use an alkyl metalate of formula (IX) or (X), the mole ratio of Si to $M^1$ in the tetraalkyl orthosilicate and formula (IX), respectively, or the mole ratio of Si to $M^2$ in the tetraalkyl orthosilicate and formula (X), respectively, is preferably greater than or equal to about 10.

Suitable alkyl metalates of formulae (IX) and (X) include, but are not intended to be limited to, tetraethyl orthotitanate, tetramethyl orthotitanate, tetraisopropyl orthotitanate, trimethyl aluminate, triethyl aluminate, tri(n-propyl)aluminate, tri(isopropyl)aluminate, tri(n-butyl)aluminate, tri(sec-butyl) aluminate, tri(tert-butyl_aluminate, tetramethyl zirconate, tetraethyl zirconate, and tetrapropyl zirconate. Suitable alkyl metalates also include those compounds in which one or more of the alkoxy groups bonded to the metal may be the same, or they can all be different from one another. Alkoxy metal compounds of silicon and titanium are preferred compounds since these are readily prepared by methods well known in the art, or available commercially, such as for example, the TYZOR series of titanium alkoxy compounds available from DuPont.

The zeolite compositions comprising the structural units of formulae (I)–(III), and those further comprising the structural units of formula (VII) or (VIII) can be prepared by a variety of methods. Synthesis of the zeolite materials can be accomplished via surface-modification techniques, whereby the surface-reactive groups (e.g., surface hydroxy groups) are chemically reacted with other chemical compounds. The zeolite materials disclosed herein possess several advantages that make them attractive candidates as a catalyst for organic reactions. First, zeolite materials, such as for example, the mesoporous zeolites potentially are able to overcome the diffusional constraints generally observed with other solid acid catalyst materials. While not wanting to be bound by theory, it is believed that this phenomenon is primarily due to the ability to form well-defined pore shapes and pore sizes from the synthesis process. Secondly, zeolites with very high surface area (defined as those having a surface area of greater than or equal to about 500 meters square per gram of the zeolite) and wide distribution of tailor-made pore sizes (from about 3 angstroms to about 100 angstroms) can be prepared by a proper choice of template compounds and reaction conditions. Third, zeolites serve as excellent host materials for guest species, such as for example, in applications requiring heterogenization of homogeneous metal complex species on the walls of the zeolite channels. Fourth, zeolite syntheses can be monitored more easily than for example, ion exchange resins, by using techniques, such as surface area, pore size, and pore size distribution measurements. Further, the silica/alumina ratio and the hydrophobicity of the zeolite can be controlled. The acidity of the zeolite is also manipulated which will control the interaction with reactants and products.

An in-situ method for forming the functionalized zeolites comprises reacting, in-situ, at least one first reactant selected from the group consisting of fumed silica and an alkyl metalate comprising a silica precursor, such as a tetraalkyl orthosilicate, a mercapto-functionalized alkoxysilane, an organosilyl sulfonic acid compound, and a template. Although not wishing to be bound by theory, it is believed that the template aids in controlling the pore size (and/or the pore size distribution) in the final zeolite composition. Suitable templates are quaternary ammonium salts of formula (XI):

$$(R^9R^{10}R^{11}R^{12})N^+ X^- \qquad (XI);$$

wherein $R^9$, $R^{10}$, $R^{11}$, and $R^{12}$ are alkyl groups independently comprising from about 1 to about 20 carbon atoms; and "X" is independently selected from the group consisting of OH, Cl, Br, F, and I. Preferably, the template comprises cetyltrimethylammonium bromide, dodecyltrimethylammonium bromide, or tetramethylammonium hydroxide, or mixtures comprising at least one of the foregoing template compounds. Other templates that can be used for preparing the functionalized zeolites include non-ionic surfactants, non-limiting examples of which include the polyalkylene block copolymers. Suitable examples of polyalkylene block copolymers include, for example, the poly(ethylene oxide—propylene oxide—ethylene oxide) block copolymers available from BASF, and exemplified by PLURONIC™ L121, L64, L127, F88, L123, L103, P65, P85, and 25R4; and TETRONIC™ 908 and 90R4. Other examples of templates that can be used include the BRIJ™ series materials, such as BRIJ™ 52, 30, 78, 35, and 76; and the TWEEN™ series of materials, such as TWEEN™ 20, 40, and 60, available from Aldrich Chemical Company.

Suitable solvents for preparing the zeolite compositions are preferably polar solvents, such as alcohols or water. Preferred polar solvents comprise water or $C_1$ to $C_8$ alcohols. Mixtures of one or more alcohols can be used. Likewise, mixtures of alcohols and water can also be used. Preferred alcohols include fully or partly water-miscible aliphatic alcohols, such as methanol, ethanol, n-propanol, isopropanol, tert-butanol, n-butanol, n-pentanol, and the like. The reactions are carried out at a temperature from about ambient temperature to about 125° C. in one embodiment, and from about 60° C. to about 80° C. in another embodiment. The reactions to prepare the zeolites can be accomplished by normal thermal means (such as for example, heating mantle, oil bath, and the like), or by using microwave energy. A wide variety of functionalized zeolites can thus be prepared.

The relative proportion of the structural units (I), (II), and (III), and optionally (IV) or (V), if present, can be achieved by varying the relative mole ratio of the tetraalkyl orthosilicate to the alkyl metalate of formulae (IX) and (X) from about 1:1 to about 100:1. Alternatively, the relative weight ratio of the mercapto-functionalized alkoxysilane (V) to the organosilyl sulfonic acid compound (VI) can be varied from about 0.25:1 to about 4:1. By varying the relative weight ratio of the reactants of the mercapto-functionalized alkoxysilane and the organosilyl sulfonic acid compound, one can advantageously prepare zeolites having targeted acid strengths.

An alternative method of preparing the functionalized zeolite compositions comprises a step-wise process. Unlike the in-situ method described above, this method does not utilize an organosilyl sulfonic acid compound as one of the reactants. In one embodiment, the method comprises as the first step, reacting a template compound as described above, a first reactant, and a first mercapto-functionalized alkoxysilane to form a first intermediate product. The first reactant is at least one compound selected from the group consisting of fumed silica and a silica precursor, such as a tetraalkyl orthosilicate. Suitable fumed silicas can generally have any surface area. More preferably, the fumed silica has a surface area from about 200 meters square per gram to about 400 meters square per gram. In other embodiments, the first reactant can further comprise an alkyl metalate of formula (IX) or (X). In this case, the relative mole ratio of the tetraalkyl orthosilicate to the alkyl metalate can vary from about 1:1 to about 100:1.

In the next step, the first intermediate product is treated with an oxidizing agent to convert the mercapto groups into sulfonic acid groups and form a second intermediate product. In general, the oxidizing agent is taken in an amount so as to oxidize substantially all of the mercapto groups to form sulfonic acid groups. However, a lesser amount of the oxidizing agent can also be taken in which case the second intermediate product will have both mercapto and sulfonic acid groups. Any oxidizing agent known in the art for converting a mercapto group into a sulfonic acid group can be used. Non-limiting examples of such oxidizing agents include hydrogen peroxide, aliphatic peracids, such as peracetic acid, and aromatic peracids, such as meta-chloroperbenzoic acid. The preferred oxidant is hydrogen peroxide since it is a low cost, readily available material. The oxidation step is generally carried out in a polar solvent, preferably those comprising water, or fully or partly water-miscible alcohols, such as for example, methanol, ethanol, isopropanol, and the like.

The second intermediate product is then reacted with a second mercapto-functionalized alkoxysilane in a suitable solvent to produce a product that has both sulfonic acid and mercapto groups. Suitable solvents include those comprising aromatic and aliphatic hydrocarbons such as, for example, toluene, xylene, heptane, octane, and the like. In a preferred embodiment, the first mercapto-functionalized alkoxysilane and the second mercapto-functionalized alkoxysilane are independently selected from the group consisting of 3-mercaptopropyltrimethoxysilane, 3-mercaptopropyltriethoxysilane, and mixtures of the foregoing alkoxysilanes. Any combination of the first and the second mercapto-functionalized alkoxysilanes can be used. The weight ratio of the first mercapto-functionalized alkoxysilane to the second mercapto-functionalized alkoxysilane is preferably from about 95:5 to about 5:95. Furthermore, varying the relative amounts of the silica content relative to the mercapto content and the sulfonic acid content can control the physical and chemical properties of the functionalized zeolite compositions. For example, the weight ratio of the tetraalkyl orthosilicate to the first mercapto-functionalized alkoxysilane can be varied from about 98:2 to about 60:40, and the weight ratio of the tetraalkyl orthosilicate to the second mercapto-functionalized alkoxysilane can be varied from about 98:2 to about 60:40.

In another method of preparing functionalized zeolite compositions, a heteropolyacid reactant is employed. In this method, the second intermediate product described above is reacted with a second mercapto-functionalized alkoxysilane to form a third intermediate product, which is reacted with the heteropolyacid compound to produce the functionalized zeolite composition. In one embodiment of the method, a solution of the heteropolyacid in a suitable solvent is treated with the third intermediate product, followed by evaporation of the solvent and calcinations to furnish the heteropolyacid-functionalized zeolite. Suitable solvents used for reaction with the heteropolyacid compound include water and $C_1$ to $C_8$ alcohols, such as, for example, methanol, ethanol, isopropanol, and n-butanol.

In the preparation of the third intermediate product, the weight ratio of the second intermediate product to the second mercapto-functionalized alkoxysilane can be from about 0.25:1 to about 4:1. The heteropolyacid content in the final zeolite composition can be controlled, in an embodiment, by varying the relative weight of the heteropolyacid compound and the third intermediate product; from about 2:98 to about 40:60.

The heteropolyacid compound is preferably of formula (XII) as shown:

$$(M^3)_3(M^4)(M^5)_{12}O_{40} \qquad (XII)$$

wherein $M^3$ comprises hydrogen or an alkali metal such as lithium, sodium, potassium, rubidium, and cesium; $M^4$ comprises phosphorus or silicon, and $M^5$ comprises tungsten or molybdenum. The heteropolyacid compound comprises at least one heteropolyacid metal salt selected from the group consisting of lithium, sodium, potassium, rubidium, and cesium salts, or mixtures of the foregoing salts. In a preferred embodiment, the heteropolyacid compound comprises at least one heteropolyacid selected from the group consisting of silicotungstic acid, silicomolybdic acid, phosphotungstic acid, and phosphomolybdic acid.

In another embodiment, the heteropolyacid compound is of the formula (XIII):

$$(M^6)(M^7)(M^8)_{12}O_{40} \qquad (XIII),$$

wherein $M^6$ comprises a Group III element; $M^7$ comprises phosphorus or silicon, and $M^8$ comprises tungsten or molybdenum.

The functionalized zeolite compositions described above are valuable as catalysts for producing bisphenols (hereinafter also sometimes referred to as aromatic dihydroxy compounds). The functionalized zeolites have both the acidic sulfonic acid group to accelerate the condensation reaction forming bisphenol, as well as the mercaptan group to provide enhanced selectivity for the p,p-bisphenol isomer. The zeolites disclosed herein preferably have a surface area from about 100 to about 1200 meters square per gram of the zeolite, and more preferably, from about 600 to about 900 meters square per gram of zeolite.

The methods described herein for forming the functionalized zeolites enable the preparation of both microporous and mesoporous zeolites. As used herein, microporous zeolites preferably have a pore size of about 3 angstroms to about 14 angstroms. Mesoporous zeolites preferably have a pore size of greater than or equal to about 14 angstroms to about 100 angstroms, or more preferably from about 20 to about 40 angstroms. The use of the appropriate template enables the control of the pore size during the zeolite synthesis. For example, use of surfactants such as cetyltrimethylammonium bromide or dodecyltrimethylammonium bromide generally results in formation of mesoporous zeolites. The procedure can be used to prepare any of the MCM series of zeolites, such as for example, MCM-22 and MCM-41; and the SBA series of zeolites, such as for example, SBA-11, SBA-12, and SBA-15. In a preferred embodiment, the microporous zeolite is one or more selected from the group consisting of mordenite, ZSM-5, L-zeolite, faujasite, ferrierite, chabazite type of zeolites, and mixtures of the foregoing zeolites and the mesoporous zeolite is one or more selected from the group consisting of MCM-41, SBA-15, and mixtures of the foregoing zeolites.

Bisphenols are generally produced by reaction of a phenol with a carbonyl compound. For example, the functionalized zeolite catalysts can be used to effectively catalyze the reaction of phenol with acetone to produce bisphenol A. Although preference is given to acetone, any type of carbonyl compound, such can be used for the condensation reaction with the phenol, e.g., aldehydes and ketones. Suitable carbonyl compounds include acetone, methyl ethyl ketone, diethyl ketone, benzyl, acetyl acetone, methyl isopropyl ketone, methyl isobutyl ketone, acetophenone, ethyl phenyl ketone, cyclohexanone, cyclopentanone, benzophenone, fluorenone, indanone, anthraquinone, 4-hydroxyacetophenone, 4,4'-dihydroxybenzophenone, acenaphthenequinone, quinone, benzoylacetone diacetyl, fluorenone, bicyclo[2.2.1]heptan-2-one, and 3,3,5-trimethylcyclohexanone. Aldehydes, such as for example, formaldehyde, acetaldehyde, propionaldehyde, butyraldehyde or higher homologues of the formula RCHO, wherein R is alkyl of 1 to 20 carbon atoms can also be used. Dialdehydes and ketoaldehdyes, such as for example, glyoxal, phenylglyoxal or pyruvic aldehyde, can also be used. For example, condensation of two moles of phenol with one mole of formaldehyde produces bis-(4-hydroxyphenyl)methane, also known as Bisphenol F.

The aromatic hydroxy compound that can be used for producing the bisphenols can be a substituted or an unsubstituted aromatic compound containing at least one OH group. Suitable aromatic hydroxy compounds include, but are not intended to be limited to, phenol, 2-cresol, 3-cresol, 4-cresol, 2-chlorophenol, 3-chlorophenol, 4-chlorophenol, 2-tert-butylphenol, 2,4-dimethylphenol, 2-ethyl-6-methylphenol, 2-bromophenol, 2-fluorophenol, 2-phenoxyphenol, 3-methoxyphenol, 2,3,6-trimethylphenol, 2,3,5,6-tetramethylphenol, 2,6-xylenol, 2,6-dichlorophenol, 3,5-diethylphenol, 2-benzylphenol, 2,6-di-tertbutylphenol, 2-phenylphenol, 1-naphthol, and 2-naphthol. Any mixture of the foregoing aromatic hydroxy compounds can also be used. Phenol is a particularly desirable aromatic hydroxy compound for producing bisphenol A by reaction with acetone. Also desirable is ortho-cresol for producing 1,1-bis (4-hydroxy-2-methylphenyl)cyclohexane by reaction with cyclohexanone.

The functionalized zeolite catalysts can be used for reaction of the carbonyl compound with the aromatic dihydroxy compound in either a batch or a continuous mode. In a batch mode, the carbonyl compound and the aromatic hydroxy compound are preferably stirred in the presence of the functionalized zeolite catalyst. The progress of the reaction can be followed by numerous analytical techniques, such as gas chromatography or high-pressure liquid chromatography. In the continuous process of producing bisphenols, the carbonyl compound and the aromatic hydroxy compound are continuously introduced into at least one reactor comprising a fixed bed or fluidized bed packing comprising the functionalized zeolite catalyst at an appropriate temperature. For example, the continuous process for making bisphenols can be carried out in a single reactor packed with the functionalized zeolite catalyst, wherein the phenol is passed continuously into then reactor and the carbonyl compound is selectively introduced in one or more stages of the reactor. The staged addition of carbonyl compound has the potential to offer improved selectivity for bisphenols. In particular, the staged addition of carbonyl compound can improve the selectivity for the p,p-bisphenol isomer. The functionalized zeolite catalysts can be used in a variety of forms, as a powder, as pellets of any shape, as a coating on the outside of an inert aggregate or bead made of materials, such as alumina, silica, and the like; as a coating on the inside of a pipe reactor, or as a monolithic structure.

The feed comprising the phenol and the carbonyl compound is preferably introduced to the functionalized zeolite catalyst at a temperature from about 10° C. to about 200° C. Within this range the introductory temperature is preferably greater than or equal to about 30° C.,more preferably greater than or equal to about 40° C., and even more preferably greater than or equal to about 45° C. Passing the feed through the functionalized zeolite catalyst results in an effluent comprising bisphenol, residual starting materials, water produced as a byproduct of the reaction, and other byproducts. The bisphenol (in the effluent) is predominantly produced as para-para (p/p) bisphenol although some ortho-para (o/p) isomer is produced. The average ratio of p/p to o/p is greater than or equal to about 20.

The bisphenol is then isolated from the residual starting materials, water and byproducts. In the isolation process, water, residual carbonyl compounds, and optionally, some residual phenol are removed by vacuum distillation. The removed carbonyl compound and residual phenol can be separated from the water and recycled to the reaction feed. The p/p bisphenol may be isolated from the bisphenol containing product stream by methods known in the art, such as adduct crystallization, solvent crystallization, melt crystallization, distillation, or a combination of the foregoing isolation methods. The phenol compound removed from the product stream may be recycled for use in the catalyzed reaction or adduct crystallization, when present. Advantageously, the high degree of selectivity of the reaction for p/p bisphenol results in the amount of impurities being greatly reduced, thus facilitating the isolation of the p/p bisphenol, improving the overall efficiency of the reaction and isolation.

Many catalysts that are used commercially do not exhibit very high selectivity if the feed comprises only phenol and ketone. A technique frequently used to achieve higher bisphenol selectivity is to use a feed stream comprising not only fresh aromatic hydroxy compound and carbonyl compound, but also a recycle stream comprising impurities generally produced in a previous alkylation reaction (or pass, for a continuous process). This approach generally gives higher overall bisphenol selectivity, particularly for the p,p-bisphenol isomer. In this case, the net selectivity can be improved by recycling impurities to the reactor to suppress isomerization reactions and/or further production of impurities. For example, if a recycle stream containing (among other impurities) ortho-para-bisphenol isomer is contacted with the functionalized zeolite catalyst, the ortho, para-bisphenol can undergo isomerization to the para,para-bisphenol isomer, thereby enhancing the overall para,para-bisphenol content in the reactor effluent. This enables simpler downstream isolation schemes because the purity of bisphenol in the reactor effluent is higher. The zeolite catalysts therefore are capable of producing high bisphenol selectivity in general, and para,para-selectivity in particular, under conditions where the reactor feed comprises substantial levels of impurity recycle to the reactor, as compared to the bisphenol selectivity expected with a virgin feed, that is, the feed does not comprise a substantial impurity recycle.

In other embodiments of the continuous process, the single or multiple reactor system comprising the fixed bed packing of the catalyst may further comprise packing structures designed to alleviate the hydraulic stress that generally results from prolonged operation. Such packing structures may assume a variety of structures specially designed to withstand hydraulic stress, and may comprise materials inert to the reactive materials used for producing bisphenols. For example, the packing structures may comprise materials, such as steel, aluminum, ceramic, and the like. The functionalized zeolite compositions disclosed herein in this disclosure are expected to have crushing strengths much higher than those reported for the traditionally used acidic ion exchange resin catalysts. Thus, the presence of the packing structures is expected to further improve the lifetime of the catalyst packing.

Aromatic dihydroxy compounds (that can be prepared using the functionalized zeolite catalysts comprise those of the general formula (XIV):

wherein $A^2$ is an aromatic group.

In a preferred embodiment, $A^2$ preferably has a structure as shown in formula (XV):

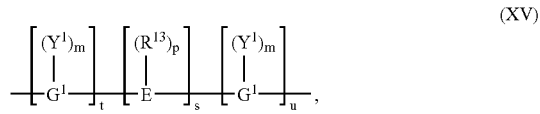

wherein $G^1$ independently represents an aromatic group, such as phenylene, biphenylene, naphthylene, and the like aromatic groups; and E may be an alkylene or alkylidene group such as methylene, ethylene, ethylidene, propylene, propylidene, isopropylidene, butylene, butylidene, isobutylidene, amylene, amylidene, isoamylidene, and the like. Alternatively, E may consist of two or more alkylene or alkylidene groups connected by a moiety different from alkylene or alkylidene, such as an aromatic linkage, a tertiary amino linkage, an ether linkage, a carbonyl linkage, a silicon-containing linkage, a sulfur-containing linkage such as sulfide, sulfoxide, sulfone, a phosphorus-containing linkage such as phosphinyl, phosphonyl, and like linkages. In addition, E may comprise a cycloaliphatic group. $R^{13}$ represents hydrogen or a monovalent hydrocarbon group such as alkyl, aryl, aralkyl, alkaryl, cycloalkyl, and the like. $Y^1$ independently comprises a halogen (e.g., fluorine, bromine, chlorine, iodine, and the like); a nitro group; an alkenyl group, allyl group, a monovalent hydrocarbon group such as alkyl, aryl, aralkyl, alkaryl, cycloalkyl, an oxy group such as OR, and the like. In a preferred embodiment, $Y^1$ is inert to and unaffected by the reactants and reaction conditions used to prepare the polymer. The letter "m" represents any integer from and including zero through the number of positions on $G^1$ available for substitution; "p" represents an integer from and including zero through the number of positions on E available for substitution; "t" represents an integer equal to at least one; "s" is either zero or one; and "u" represents any integer including zero.

Suitable examples of E include cyclopentylidene, cyclohexylidene, 3,3,5-trimethylcyclohexylidene, methylcyclohexylidene, 2-[2.2.1]-bicycloheptylidene, neopentylidene, cyclopentadecylidene, cyclododecylidene, adamantylidene, etc.); a sulfur-containing linkage such as sulfide, sulfoxide or sulfone, a phosphorus-containing linkage such as phosphinyl, phosphonyl, an ether linkage, a carbonyl group, a tertiary nitrogen group, and a silicon-containing linkage such as a silane or siloxy linkage.

In the aromatic dihydroxy compound shown in Formula (XIV) when more than one $Y^1$ substituent is present, they may be the same or different. The same holds true for the $R^{13}$ substituent. Where "s" is zero and "u" is not zero, the aromatic rings are directly joined with no intervening alkylidene or other bridge. The positions of the hydroxyl groups and $Y^1$ on the aromatic nuclear residues $G^1$ can be varied in the ortho, meta, or para positions and the groupings can be in vicinal, asymmetrical or symmetrical relationship, where two or more ring carbon atoms of the hydrocarbon residue are substituted with $Y^1$ and hydroxyl groups. In some embodiments, the parameters "t", "s", and "u" are each one; both $G^1$ groups are unsubstituted phenylene groups; and E is an alkylidene group such as isopropylidene. In particular embodiments, both $G^1$ groups are p-phenylene, although both may be ortho- or meta-phenylene or one ortho- or meta-phenylene and the other para-phenylene.

Some illustrative, non-limiting examples of aromatic dihydroxy compounds of formula (XV) prepared using the functionalized zeolite catalysts include the dihydroxy-substituted aromatic hydrocarbons disclosed by name or formula (generic or specific) in U.S. Pat. No. 4,217,438. Some particular examples of aromatic dihydroxy compounds include 4,4'-(3,3,5-trimethylcyclohexylidene)diphenol; 4,4'-bis(3,5-dimethyl)diphenol; 4,4-bis(4-hydroxyphenyl)heptane; 2,4'-dihydroxydiphenylmethane; bis(2-hydroxyphenyl)methane; bis(4-hydroxyphenyl)methane; bis(4-hydroxy-5-nitrophenyl)methane; bis(4-hydroxy-2,6-dimethyl-3-methoxyphenyl)methane; 1,1-bis(4-hydroxyphenyl)ethane; 1,1-bis(4-hydroxy-2-chlorophenyl)ethane; 2,2-bis(4-hydroxyphenyl)propane (commonly known as bisphenol A); 2,2-bis(3-phenyl-4-hydroxyphenyl)propane; 2,2-bis(4-hydroxy-3-methylphenyl)propane; 2,2-bis(4-hydroxy-3-ethylphenyl)propane; 2,2-bis(4-hydroxy-3-isopropylphenyl)propane; 2,2-bis(4-hydroxy-3,5-dimethylphenyl)propane; 2,2-bis(3,5,3',5'-tetrachloro-4,4'-dihydroxyphenyl)propane; bis(4-hydroxyphenyl)cyclohexylmethane; 2,2-bis(4-hydroxyphenyl)-1-phenylpropane; 2,4'-dihydroxyphenyl sulfone; 2,6-dihydroxy naphthalene; hydroquinone; resorcinol; and $C_{1-3}$ alkyl-substituted resorcinols. More particularly, the aromatic dihydroxy compound is selected from the group consisting of bisphenol A, 1,1'-bis(4-hydroxy-3-methylphenyl)cyclohexane, or mixtures of the foregoing aromatic bisphenols.

Bisphenols prepared in accordance with the methods described herein are especially suitable for preparing polycarbonates. The functionalized zeolite catalysts described in this disclosure are useful for producing a variety of aromatic bisphenols in high yield and selectivity. Moreover, the use of functionalized zeolite catalysts offer improved mechanical strength and less fouling over prolonged periods of use, which results in longer catalyst lifetimes, thereby reducing operating costs. Polycarbonates are generally prepared by the polymerization reaction of an aromatic dihydroxy compound with a carbonate precursor, such as carbonyl halides or diaryl carbonates. Methods of polymerization include those disclosed in the art, such as interfacial polymerization, melt polymerization, solid—state polymerization, and solution polymerization. The bisphenols thus obtained are valuable for producing the polycarbonates compositions, which in turn are useful for making various articles useful for high heat, optical, and engineering applications.

The disclosure is further illustrated by the following non-limiting examples.

EXAMPLES

The following abbreviations are used to describe the various reactants used for preparing the catalysts, Cat-1–Cat 15. All catalyst structures were analyzed using powder X-ray diffraction and infrared spectral measurements.

CTAB: Cetyltrimethylammonium bromide; TMAH: Tetramethylammonium hydroxide; DTAB: Dodecyltrimethylammonium bromide; TEOS: Tetraethylorthosilicate; TSPS: (3-trihydroxysilyl)propanesulfonic acid; MPTMS: (3-mercaptopropyl)trimethoxysilane.

X-ray diffraction measurements were carried out using a Rigaku Miniflex Diffractometer with CuK (alpha) radiation (lambda=1.5406 angstroms). Infrared spectra were obtained using Shimadzu FTIR-8201 PC instrument (Diffused reflectance spectroscopy mode). BET surface area measurements were carried out on the synthesized catalysts.

Table 1 shows the starting materials and amounts used for preparing the various catalysts in accordance with the detailed procedures described below.

Comparative Example 1

This example describes the preparation of Cat-11 shown in Table 1. H-Al-MCM-41, non-functionalized mesoporous zeolite (designated as cat-17 and prepared according to the procedure described below under Comparative Example 7) and MPTMS were refluxed in dry toluene (as solvent) for about four hours under a nitrogen atmosphere. The resulting material was recovered by centrifugation, and dried in an oven at about 100° C. for about 10 hours. The resulting material was oxidized by treatment with excess $H_2O_2$ (30 weight percent aqueous solution) for about 24 hours at ambient temperature. The resulting material was filtered, washed with distilled water several times, then with ethanol, and dried in an oven at about 100° C. for about 10 hours to give Cat-11.

Comparative Example 2

This Comparative Example describes the preparation of sulfonic acid-functionalized H—Si-MCM-41 catalyst, as referred to in Table 1 as Cat-12.

CTAB was added to TMAH aqueous solution with stirring at room temperature until a homogeneous solution formed. To this solution, with stirring, was slowly added a mixture of TEOS and MPTMS in methanol. After being stirred for about 6 hours, the reaction mixture was heated under reflux for about 48 hours. The reaction mixture was then filtered, washed with distilled water several times, then acetone, and dried as described before. A template compound was extracted from the dried material by refluxing with a mixture of methanol and concentrated hydrochloric acid (100 grams methanol and 5 grams hydrochloric acid per gram of the dried catalyst) for about 24 hours. The final product was filtered and dried in oven at about 100° C. The mercaptan groups in the product were oxidized to the sulfonic acid form by stirring the product with a three-fold excess of aqueous hydrogen peroxide for about 24 hours at room temperature. The resulting product (Cat-12) was filtered, washed with water, ethanol, and dried in an oven at about 100° C.

Comparative Examples 3 and 4

These examples describe the preparation of catalysts Cat-13 and Cat-14, respectively, as referred to in Table 1.

To prepare Cat-13, H-beta zeolite and MPTMS were refluxed in dry toluene for about 4 hours under an inert atmosphere. In a similar manner, Cat-14 was prepared by refluxing H-Mordenite and MPTMS. The resulting solid materials were recovered by centrifugation, and dried in an oven at about 100° C. for about 10 hours. The dried materials were then separately oxidized by treatment with an excess of $H_2O_2$ (30 weight percent aqueous solution) for about 24 hours at room temperature. The resulting solid materials were filtered, washed with distilled water several times, then with ethanol, and dried in an oven at about 100° C. for about 10 hours to furnish the desired catalysts, i.e., Cat-13 and Cat-14.

Comparative Example 5

This Example describes the procedure for preparing a heteropolyacid-functionalized zeolite that is referred to in Table 1 as Cat-15.

To a solution of the heteropolyacid compound $H_4SiW_{12}O_{40}$ in methanol was added silica or Si-MCM-41, followed by refluxing at about 60° C. for about 3 hours. The solvent was evaporated and the resulting solid material was dried and calcined at about 250° C. for about three hours.

Comparative Example 6

This Example describes the preparation of Si-MCM-41 (Cat-16), which can be used as a substrate for preparing the functionalized zeolite catalysts.

CTAB was added to an aqueous TMAH solution with stirring at room temperature until a homogeneous solution formed. Fumed silica was then added to the solution with stirring over a period of about one hour, stirred for an additional three hours at room temperature, and then heated under reflux for about 48 hours. The reaction mixture was filtered, washed with distilled water several times, then with acetone, and dried in oven maintained at about 100° C. for about 10 hours. The dried material was calcined in an oven maintained at about 540° C. for about 10 hours to give the desired product, i.e., Cat-16.

Comparative Example 7

This Example describes the preparation of H-Al-MCM-41 mesoporous zeolite, referred to as Cat-17 in Table 1.

CTAB was added to TMAH in water with stirring at room temperature until a homogeneous solution formed. Fumed silica was added to the solution with stirring over a period of about one hour. To the resulting mixture was added sodium aluminate (0.6 grams) and stirred for about three hours at room temperature, followed by heating to reflux for about 48 hours. The resulting mixture was filtered, washed with distilled water several times, then with acetone, and dried in oven maintained at about 100° C. for about 10 hours. The dried material was calcined in an oven maintained at about 540° C. for about 10 hours. The sodium form of the calcined dried material was then converted to the hydrogen form by refluxing with an ammonium nitrate solution (20 milliliters of a 1 Molar solution was taken per gram of the sodium form of the catalyst). The resulting material was filtered, washed as described before, filtered, and calcined at 540° C. for about 10 hours to furnish Cat-17.

Comparative Example 8

This example utilized Lewatit K1131 ion exchange resin, an acidic sulfonated styrene-divinylbenzene copolymer obtained commercially from Bayer Chemicals, and referred to in Table 1 as Lewatit K1131.

Example 1

This Example describes the preparation of the functionalized zeolite catalyst Cat-1.

CTAB was added to an aqueous solution of TMAH with stirring at room temperature until a homogeneous solution formed. To this mixture was slowly added with stirring a mixture of TEOS, MPTMS, and TSPS in methanol. After being stirred for about 6 hours, the reaction mixture was heated under reflux for about 48 hours. The reaction mixture was filtered, washed with distilled water several times, then acetone, and dried in an oven at about 100° C. for about 10 hours. Template extraction was done by refluxing with methanol and concentrated hydrochloric acid (100 grams of methanol and 5 grams of hydrochloric acid per gram of the catalyst). The resulting product, i.e., Cat-1, was filtered and dried.

Examples 2 and 3

These Examples describe the preparation of functionalized zeolite catalysts Cat-2 and Cat-3.

Generally, both Cat-2 and Cat-3 were prepared by adding CTAB to a TMAH aqueous solution with stirring at room temperature until a homogeneous solution formed. To this solution was slowly added with stirring, a mixture of TEOS and MPTMS-1 (3-mercaptopropyltrimethoxsiloxane, referred to as the first mercapto-functionalized alkoxysilane) in methanol. After being allowed to stir for about 6 hours, the reaction mixture was then heated under reflux for about 48 hours. The solid material obtained was filtered, washed with distilled water several times, then acetone, and dried in oven at about 100° C. for about 10 hours. Template extraction was done as previously described in Example 1, followed by drying the resulting materials to give the first intermediate product.

The mercaptan groups of the first intermediate product were oxidized by treatment with a three-fold excess of aqueous hydrogen peroxide and stirring for about 24 hours at room temperature. The resulting solid product after being washed with water and ethanol, and subsequently dried at 100° C. to produce the second intermediate product. The second intermediate product was treated with MPTMS (3-mercaptopropyltrimethoxsiloxane, referred to as the second mercapto-functionalized alkoxysilane) in dry toluene and heated to reflux for about 4 hours. The solid material was filtered, washed with water, ethanol, and finally dried at about 100° C. for about 10 hours to furnish the desired catalysts, i.e., Cat-2, and Cat-3.

Examples 4 and 10

This Example describes the preparation of the catalysts, Cat-4 and Cat-10. The procedure used was identical to those described above for preparing catalysts Cat-2 and Cat-3, except that DTAB was used instead of CTAB.

Examples 5–9

These Examples describe the preparation of the catalysts Cat-5, Cat-6, Cat-7, Cat-8, and Cat-9, as exemplified by the following general procedure.

The preparation of the first intermediate product, the second intermediate product, and its subsequent reaction with the second mercapto-functionalized alkoxysilane MPTMS (to form a third intermediate product) was identical to the method previously described for preparing the catalysts Cat 2 and Cat-3. The third intermediate product after being dried was reacted with the heteropolyacid compound as follows.

The dried third intermediate product was refluxed with a solution of silicotungstic acid in 60 milliliters of methanol for about 3 hours. The resulting solution was evaporated, and the solid material remaining was dried at about 100° C. for about 10 hours, followed by calcination at about 200° C. for about 2 hours to furnish the desired catalyst.

Example 11

In this Example, the performance of the various functionalized zeolite catalysts produced above was evaluated for a batch process in the reaction of phenol with acetone to form bisphenol A (BPA).

A 20-milliliter vial equipped with a gas-tight septum was charged with phenol (12 grams), the catalyst (0.6 gram, about 5 weight percent), and placed in an oil bath maintained at a temperature of about 75° C. Then acetone was injected into the vial via a gas-tight syringe so that it forms 4.5 weight percent of the reaction mixture. The time at which acetone was added corresponded to zero time, i.e., start of the reaction. The progress of the reaction was monitored by gas chromatography (GC) by taking aliquots of the reaction mixture at different time intervals. The reaction was allowed to proceed for about 24 hours. Sample preparation for GC analysis was carried out as follows.

A sample weighing about 50 milligrams was withdrawn from each vial and weighed accurately. Then 0.5 milliliter of acetonitrile, followed by dioctyl phthalate (internal standard for GC analysis) was added. To a 0.2 milliliter sample of this solution was added 0.5 milliliter of a derivatizing solution containing bis(trimethylsilyl)acetamide (BSA) or bis(trimethylsilyl)trifluoroacetamde (BTSA). The derivatizing solution was prepared by mixing 50 milliliters of acetonitrile, 25 milliliters of acetone, and 25 milliliters of BSA or BTSA. The resulting solution was used for GC analysis with an experimental error in measurement of ±0.2% with a 99% confidence. The results obtained from evaluating the catalysts are also shown in Table 1 below. "NA" in the Table denotes "Not Applicable".

Analytical Procedures

Weight percent of acetone was determined by treatment of the sample with hydroxylamine hydrochloride, followed by titration of the liberated HCl. The weight percents of para-para-BPA, ortho-para-BPA, phenol, and bisphenol impurities in a reaction mixture sample were determined by standard high-pressure liquid chromatography (HPLC), with an experimental error in measurement of ±0.66% with a 99% confidence. The weight percent p, p-BPA selectivity was expressed as the ratio of the measured weight of p, p-BPA divided by the total weight of all components detected by the measurement technique (GC or HPLC). The quantitative determination of water in samples was carried out using Karl Fischer titration method. The results obtained from the various screening runs to evaluate the zeolite compositions as catalysts are shown in Tables 1.

TABLE 1

| Example. No. | Catalyst | Zeolite substrate (grams) | TMAH (grams of 25 weight percent solution) | CTAB (grams) | DTAB (grams) | TEOS (Grams) | MPTMS-1 (Grams) | MPTMS-2 (Grams) | TSPS (Weight percent) | $H_3SiW_{12}O_{40}$ (Grams)) | Surface area (square meters/gram) | p,p-BPA selectivity (Weight percent) |
|---|---|---|---|---|---|---|---|---|---|---|---|---|
| 1 | Cat 1 | NA | 10.9 | 9.1 | NA | 16.6 | 4.1 | NA | 12 | NA | NA | 91 |
| 2 | Cat-2 | NA | 6 | 7.6 | NA | 17.2 | 1.1 | 1.1 | NA | NA | 699 | 93 |
| 3 | Cat-3 | NA | 8 | 10 | NA | 22.2 | 1.2 | 2.4 | NA | NA | 449 | 96 |
| 4 | Cat-4 | NA | 6.8 | NA | 7.2 | 18.4 | 0.8 | 0.8 | NA | NA | NA | 95.6 |
| 5 | Cat-5 | NA | 36.4 | 11.3 | NA | 24.6 | 1.2 | 1.2 | NA | 0.5 | 501 | 95 |
| 6 | Cat-6 | NA | 36.4 | 11.3 | NA | 24.6 | 1.2 | 0.6 | NA | 1.1 | 481 | 94.2 |
| 7 | Cat-7 | NA | 34.8 | 10.9 | NA | 24.3 | 0.6 | 1.2 | NA | 1.2 | 204 | 93.7 |
| 8 | Cat-8 | NA | 6.3 | 7.8 | NA | 16 | 1.8 | 3.6 | NA | NA | 580 | 95.4 |
| 9 | Cat-9 | NA | 44.4 | 20.3 | NA | 16.2 | 3.6 | 1.2 | NA | NA | 841 | 95.6 |
| 10 | Cat-10 | NA | 12 | NA | 12.5 | 30.2 | 3.6 | 2.7 | NA | NA | 491 | 95.9 |
| 1* | Cat-11 | H—Al-MCM-41 (6) | NA | NA | NA | NA | 9.8 | NA | NA | NA | NA | 79.5 |
| 2* | Cat-12 | NA | 21.9 | 8.2 | NA | 33.3 | 16.5 | NA | NA | NA | NA | 82 |
| 3* | Cat-13 | H-Beta (6) | NA | NA | NA | NA | 3.6 | NA | NA | NA | NA | 85.5 |
| 4* | Cat-14 | H-Mordenite (6) | NA | NA | NA | NA | 3.6 | NA | NA | NA | NA | 68.3 |
| 5* | Cat-15 | Si-MCM-41 (5.6) | NA | NA | NA | NA | NA | NA | NA | 1.4 | 734 | 81.9 |
| 6* | Cat-16 | Fumed silica (6) | 10.9 | 9.1 | NA | NA | NA | NA | NA | NA | NA | 91.4 |
| 7* | Cat-17 | Fumed silica (12) | 19 | 13.1 | NA | NA | NA | NA | NA | NA | 829 | 90.5 |
| 8* | Lewatit K1131 | NA | NA | NA | NA | NA | NA | NA | NA | NA | NA | 92.1 |

*Denotes Comparative Example.

The results show that zeolites functionalized with mercaptan (SH) groups and sulfonic acid ($SO_3H$) groups function as catalysts for the reaction of phenol and acetone to form BPA. Moreover, the selectivities obtained with the functionalized zeolite catalysts are superior to those obtained with zeolites that are not functionalized with SH and $SO_3H$ groups. Further, the functionalized zeolite catalysts are superior to zeolites having only SH or $SO_3H$ groups. Other advantages of the functionalized zeolites include, among others, no separate promoter is required, minimal or no swelling occurs during use, high mechanical strength, hydrothermal stability, and no pretreatment with phenol is required.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims. All Patents cited herein are incorporated herein by reference.

The invention claimed is:

1. A functionalized mesoporous zeolite composition comprising structural units of the formulae:

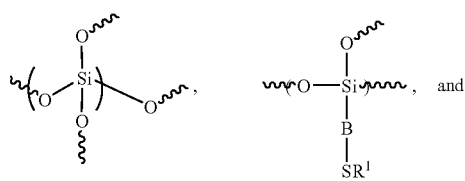

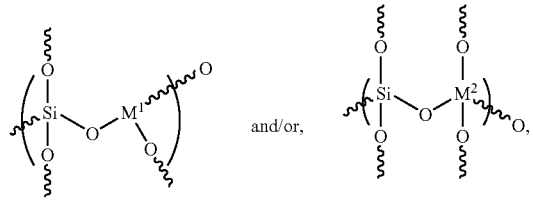

wherein "B" and "C" are spacer groups comprising $C_2$ to $C_{20}$ hydrocarbyl groups, and $R^1$ and $R^2$ independently comprise an alkali metal, a hydrogen, or a $C_1$ to $C_{20}$ alkyl group.

2. The functionalized mesoporous zeolite composition of claim 1, further comprising a structural unit having a formula:

wherein $M^1$ comprises a Group III element selected from the group consisting of boron, aluminum, gallium, or combinations of the foregoing Group III elements; and $M^2$ comprises a Group IV element selected from titanium, zirconium, or combinations of the foregoing Group IV elements.

3. The functionalized mesoporous zeolite composition of claim 1, wherein the formula has a mole ratio of Si to $M^1$ and/or Si to $M^2$ greater than or equal to about 10.

4. The functionalized mesoporous zeolite composition of claim 1, comprising a microporous zeolite structure having a pore size of about 3 to about 14 angstroms or a mesoporous zeolite structure having a pore size of greater than or equal to about 14 to about 100 angstroms.

5. The functionalized mesoporous zeolite composition of claim 1, wherein the structural units form a mesoporous zeolite structure comprising MCM-41, SBA-15, or mixtures comprising at least one of the foregoing zeolites.

6. The functionalized mesoporous zeolite composition of claim 1, wherein the functionalized zeolite composition comprises a surface area of about 100 to about 1,200 square meters per gram of said zeolite composition.

7. The functionalized mesoporous zeolite composition of claim 1, further comprising structural units derived from a heteropolyacid compound of the formula: $(M^3)_3(M^4)(M^5)_{12}O_{40}$, wherein $M^3$ comprises hydrogen or an alkali metal, $M^4$ comprises phosphorus or silicon, and $M^5$ comprises tungsten or molybdenum.

8. The functionalized mesoporous zeolite composition of claim 1, further comprising structural units derived from a heteropolyacid compound comprising silicotungstic acid, silicomolybdic acid, phosphotungstic acid, phosphomolybdic acid, or combinations comprising at least one of the foregoing heteropolyacids.

9. A method of making a functionalized zeolite composition, comprising:
reacting:
at least one reactant selected from the group consisting of a fumed silica and an alkyl metalate comprising a tetraalkyl orthosilicate and at least one compound selected from the group consisting of $(R^4O)_3M^1$ and $(R^4O)_4M^2$; wherein $R^4$ is independently at each occurrence an alkyl aroup or an aryl group having from 1 to about 20 carbon atoms; "$M^1$" comprises a Group III element selected from the group consisting of boron, aluminum, gallium, or combinations of the foregoing Group III elements; and "$M^2$" comprises a Group IV element selected from the group consisting of titanium, zirconium, or combinations of the foregoing Group IV element,
a mercapto-functionalized alkoxysilane,
a silyl sulfonic acid compound, and
a template compound; and
producing a zeolite composition comprising structural units of the formulae:

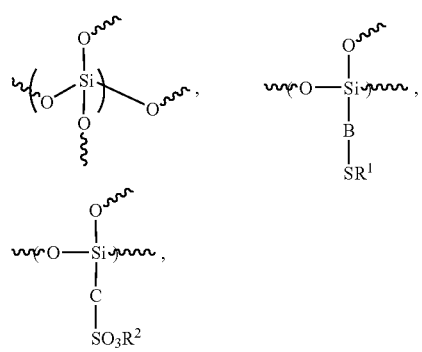

and structural units of the formulae

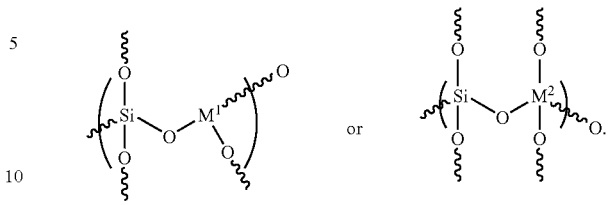

wherein "B" and "C" are spacer groups comprising $C_2$ to $C_{20}$ hydrocarbyl groups; and $R^1$ and $R^2$ independently comprise an alkali metal, a hydrogen, or a $C_1$ to $C_{20}$ alkyl group.

10. The method of claim 9, wherein the template compound comprises a quaternary ammonium salt.

11. The method of claim 9, wherein said tetraalkyl orthosilicate is of the formula $(R^3O)_4Si$, wherein $R^3$ is an alkyl group.

12. The method of claim 9, wherein said mercapto-functionalized alkoxysilane is at least one selected from the group represented by the formula $R^1S-B-Si(OR^5)_n(R^6)_{3-n}$; wherein "n" is an integer having values from 1 to about 3; $R^5$ comprises hydrogen and alkyl groups; and $R^6$ comprises alkyl groups or alkoxy groups.

13. The method of claim 9, wherein said silyl sulfonic acid compound is of the formula:

$$R^2O_3S-C-Si(OR^7)_n(R^8)_{3-n},$$

wherein "n" is an integer from 1 to 3; $R^7$ comprises hydrogen and alkyl groups; and $R^8$ comprises alkyl groups or alkoxy groups.

14. The method of claim 9, wherein said silyl sulfonic acid compound comprises 3-(trimethoxylsilyl)propane-sulfonic acid.

15. The method of claim 9, wherein reacting the at least one reactant with said alkyl metalate comprises a weight ratio of the at least one reactant to the alkyl metalate of about 1:1 to about 100:1.

16. The method of claim 9, wherein said alkyl metalate is at least one compound selected from the group consisting of tetraethyl orthotitanate, tetramethyl orthotitanate, tetraisopropyl orthotitanate, trimethyl aluminate, triethyl aluminate, tri(n-propyl)aluminate, tri(isopropyl)aluminate, tri(n-butyl) aluminate, tri(sec-butyl)aluminate, tri(tert-butyl, aluminate, tetramethyl zirconate, tetraethyl zirconate, tetrapropyl zirconate, and tetraphenyl zirconate.

17. A method of making a functionalized zeolite composition, wherein said method comprises:
reacting a template compound, at least one first reactant selected from the group consisting of fumed silica and an alkyl metalate comprising a tetraalkylorthosilicate, and a first mercapto-functionalized alkoxysilane to form a first intermediate product;
oxidizing said first intermediate product with an oxidizing agent to form a second intermediate product; and
reacting second intermediate product with a second mercapto-functionalized alkoxysilane to produce a functionalized zeolite composition comprising structural units of the formulae:

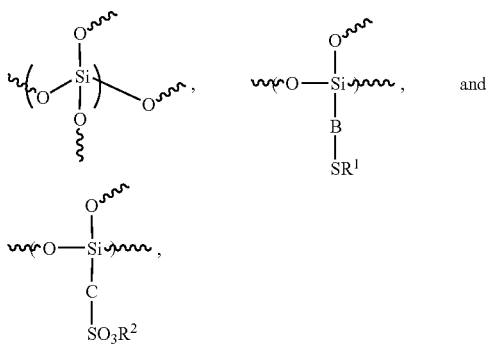

wherein "B" and "C" are spacer groups comprising $C_2$–$C_{20}$ hydrocarbyl groups; and $R^1$ and $R^2$ independently of each other comprise alkali metal, hydrogen, or alkyl groups.

18. The method of claim 17, wherein the alkyl metalate further comprises at least one compound selected from the group consisting of $(R^4O)_3M^1$ and $(R^4O)_4M^2$; wherein $R^4$ is independently at each occurrence an alkyl group or an aryl group having from 1 to about 20 carbon atoms; "$M^1$" comprises a Group III element selected from the group consisting of boron, aluminum, gallium, or combinations of the foregoing Group III elements; and "$M^2$" comprises a Group IV element selected from the group consisting of titanium, zirconium, or combinations of the foregoing Group IV element, to produce the functionalized zeolite composition further comprising structural units of the formulae:

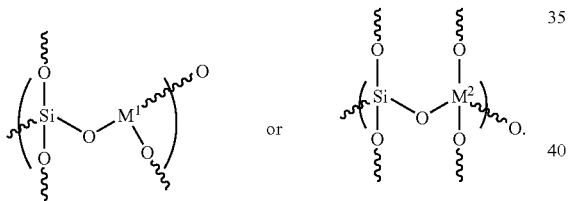

19. The method of claim 17, wherein said template compound comprises a quaternary ammonium salt.

20. The method of claim 17, wherein said alkyl metalate is of the formula: $(R^3O)_4Si$; wherein $R^3$ comprises an alkyl group.

21. The method of claim 18, wherein said alkyl metalate is at least one selected from the consisting of tetraethyl orthotitanate, tetramethyl orthotitanate, tetraisopropyl orthotitanate, trimethyl aluminate, triethyl aluminate, tri(n-propyl)aluminate, tri(isopropyl)aluminate, tri(n-butyl)aluminate, tri(sec-butyl)aluminate, tri(tert-butylaluminate, tetramethyl zirconate, tetraethyl zirconate, tetrapropyl zirconate, and mixtures of the foregoing alkyl metalates.

22. The method of claim 17, wherein said first mercapto-functionalized alkoxysilane and said second mercapto-functionalized alkoxysilane are independently selected from the group represented by the formula, $R^1S$—B—$Si(OR^5)_n(R^6)_{3-n}$, wherein "n" is an integer having values from 1 to about 3; $R^5$ comprises hydrogen or alkyl groups, and $R^6$ comprises alkyl groups.

23. The method of claim 17, wherein said oxidizing agent comprises hydrogen peroxide, an aliphatic peracid, or an aromatic peracid.

24. The method of claim 17, wherein said tetraalkyl orthosilicate and said first mercapto-functionalized alkoxysilane are present in a weight ratio from about 98:2 to about 60:40.

25. The method of claim 17, wherein said tetraalkyl orthosilicate and said second mercapto-functionalized alkoxysilane are present in a weight ratio from about 98:2 to about 60:40.

26. A method of making a heteropolyacid-functionalized zeolite composition, said method comprising:
reacting in a solvent a template compound, at least one first reactant selected from the group consisting of fumed silica and an alkyl metalate comprising a tetraalkylorthosilicate, and a first mercapto-functionalized alkoxysilane to form a first intermediate product;
oxidizing said first intermediate product with an oxidizing agent to form a second intermediate product; and
reacting the second intermediate product with a second mercapto-functionalized alkoxysilane to form a third intermediate product; and
reacting said third intermediate product with a heteropolyacid compound to produce the heteropolyacid-functionalized zeolite composition comprising structural units of the formulae:

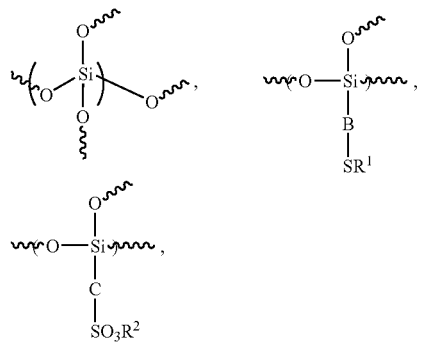

wherein "B" and "C" are spacer groups comprising $C_2$–$C_{20}$ hydrocarbyl groups; and $R^1$ and $R^2$ independently of each other comprise alkali metal, hydrogen, or alkyl groups.

27. The method of claim 26, wherein the alkyl metalate further comprises at least one compound selected from the group consisting of $(R^4O)_3M^1$ and $(R^4O)_4M^2$; wherein $R^4$ is independently at each occurrence an alkyl group or an aryl group having from 1 to about 20 carbon atoms; "$M^1$" comprises a Group III element selected from the group consisting of boron, aluminum, gallium, or combinations of the foregoing Group III elements; and "$M^2$" comprises a Group IV element selected from the group consisting of titanium, zirconium, or combinations of the foregoing Group IV element, to produce the functionalized zeolite composition further comprising structural units of the formulae:

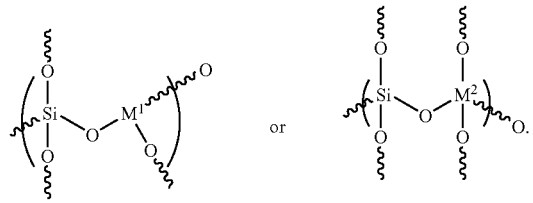

28. The method of claim 26, wherein said template compound comprises a quaternary ammonium salt.

29. The method of claim 26, wherein the fumed silica and the alkyl metalate are present at a mole ratio of about 1:1 to about 100:1.

30. The method of claim 26, wherein the heteropolyacid and the third intermediate product are present at a mole ratio of 2:98 to about 40:60.

31. The method of claim 26, wherein the second intermediate product and the second mercapto-functionalized alkoxysilane are present at a mole ratio of about 0.25:1 to about 4:1.

32. The method of claim 26, wherein said first mercapto-functionalized alkoxysilane and said second mercapto-functionalized alkoxysilane are independently selected from the group represented by the formula, $R^1S-B-Si(OR^5)_n(R^6)_{3-n}$; wherein "n" is an integer having values from 1 to about 3; $R^5$ comprises hydrogen or alkyl groups; and $R^6$ comprises alkyl groups or alkoxy groups.

33. The method of claim 26, wherein said oxidizing agent comprises hydrogen peroxide, an aliphatic peracid, or an aromatic peracid.

34. The method of claim 26, wherein said heteropolyacid compound is of the formula: $(M^3)_3(M^4)(M^5)_{12}O_{40}$; wherein $M^3$ comprises hydrogen or an alkali metal; $M^4$ comprises phosphorus or silicon, and $M^5$ comprises tungsten or molybdenum.

35. A method of producing an aromatic bisphenol, wherein said method comprises reacting a carbonyl compound with an aromatic hydroxy compound in the presence of a functionalized zeolite composition as catalyst; wherein said functionalized zeolite composition comprises structural units of the formulae:

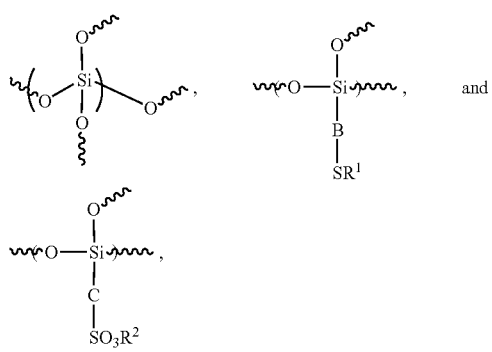

wherein "B" and "C" are spacer groups comprising $C_2$ to $C_{20}$ hydrocarbyl groups; and $R^1$ and $R^2$ independently comprise an alkali metal, a hydrogen, or an alkyl group.

36. The method of claim 35, wherein the functionalized zeolite composition further comprises structural units selected from the group consisting of formulae:

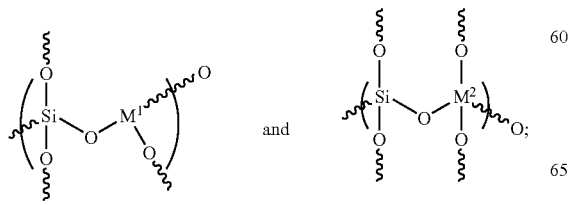

wherein $M^1$ comprises a Group III element, and $M^2$ comprises titanium or zirconium.

37. The method of claim 35, wherein said carbonyl compound is at least one selected from the group consisting of acetone, methyl ethyl ketone, diethyl ketone, benzyl, acetyl acetone, methyl isopropyl ketone, methyl isobutyl ketone, acetophenone, ethyl phenyl ketone, cyclohexanone, cyclopentanone, benzophenone, fluorenone, indanone, anthraquinone, 4-hydroxyacetophenone, 4,4'-dihydroxybenzophenone, acenaphthenequinone, quinone, benzoylacetone diacetyl, fluorenone, bicyclo[2.2.1]heptan-2-one, and 3,3,5-trimethylcyclohexanone.

38. The method of claim 35, wherein said aromatic hydroxy compound is at least one selected from the group consisting of phenol, 2-cresol, 3-cresol, 4-cresol, 2-chlorophenol, 3-chlorophenol, 4-chlorophenol, 2-tert-butylphenol, 2,4-dimethylphenol, 2-ethyl-6-methylphenol, 2-bromophenol, 2-fluorophenol, 2-phenoxyphenol, 3-methoxyphenol, 2,3,6-trimethylphenol, 2,3,5,6-tetramethylphenol, 2,6-xylenol, 2,6-dichlorophenol, 3,5-diethylphenol, 2-benzylphenol, 2,6-di-tert-butylphenol, 2-phenylphenol, 1-naphthol, and 2-naphthol.

39. The method of claim 35, wherein said zeolite composition further comprises structural units derived from a heteropolyacid compound of the formula: $(M^3)_3(M^4)(M^5)_{12}O_{40}$, wherein $M^3$ comprises hydrogen or an alkali metal; $M^4$ comprises phosphorus or silicon, and $M^5$ comprises tungsten or molybdenum.

40. The method of claim 39, wherein said heteropolyacid compound comprises at least one heteropolyacid selected from the group consisting of silicotungstic acid, silicomolybdic acid, phosphotungstic acid, and phosphomolybdic acid.

41. The method of claim 35, wherein said carbonyl compound and said aromatic hydroxy compound are reacted in a batch or a continuous process.

42. The method of claim 35, wherein said functionalized zeolite composition comprises microporous zeolites and mesoporous zeolites.

43. A method of producing a polycarbonate, the method comprising:
reacting a carbonyl compound with an aromatic hydroxy compound in the presence of a functionalized mesoporous zeolite composition comprising structural units of the formulae:

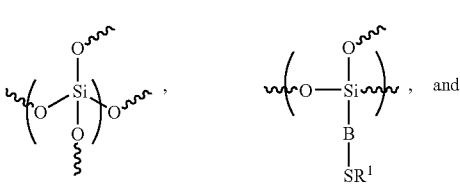

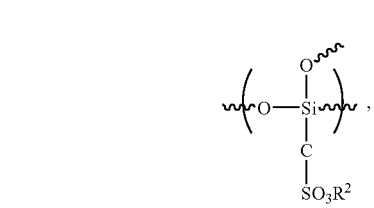

wherein "B" and "C" are spacer groups comprising $C_2$ to $C_{20}$ hydrocarbyl groups, and $R^1$ and $R^2$ independently comprise an alkali metal, a hydrogen, or a $C_1$ to $C_{20}$ alkyl group to produce an aromatic bisphenol; and reacting the aromatic bisphenol with a carbonate precursor.

44. The method of claim 43, wherein said aromatic bisphenol comprises bisphenol A.

45. A functionalized zeolite composition comprising: structural units of the formulae:

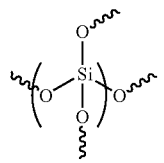, 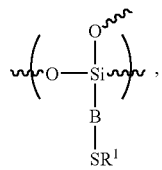,

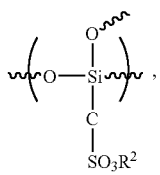, wherein "B" and "C" are spacer groups comprising $C_2$ to $C_{20}$ hydrocarbyl groups, and $R^1$ and $R^2$ independently comprise an alkali metal, a hydrogen, or a $C_1$ to $C_{20}$ alkyl group; and structural units derived from a heteropolyacid compound of the formula: $(M^3)_3(M^4)(M^5)_{12}O_{40}$; wherein $M^3$ comprises hydrogen or an alkali metal, $M^4$ comprises phosphorus or silicon, and $M^5$ comprises tungsten or molybdenum.

46. A functionalized zeolite composition comprising structural units of the formulae:

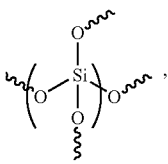, 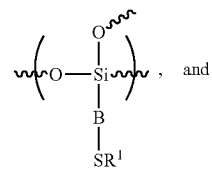 and

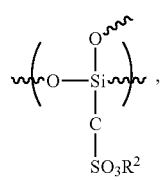, wherein "B" and "C" are spacer groups comprising $C_2$ to $C_{20}$ hydrocarbyl groups, and $R^1$ and $R^2$ independently comprise an alkali metal, a hydrogen, or a $C_1$ to $C_{20}$ alkyl group; and a structural unit having a formula:

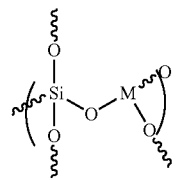 and/or 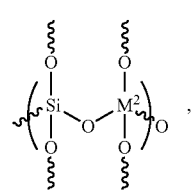, wherein $M^1$ comprises a Group III element selected from the group consisting of boron, aluminum, gallium, or combinations of the foregoing Group III elements; and $M^2$ comprises a Group IV element selected from titanium, zirconium, or combinations of the foregoing Group IV elements.

* * * * *